United States Patent Office

3,368,380
Patented Feb. 13, 1968

3,368,380
ROLLING MILL STAND
Horst Pawalkat, Leverkusen, Germany, assignor to Theodor Wuppermann Gesellschaft mit beschrankter Haftung, Leverkusen, Germany
Filed Apr. 26, 1965, Ser. No. 450,854
Claims priority, application Germany, Apr. 25, 1964, W 36,665
9 Claims. (Cl. 72—237)

ABSTRACT OF THE DISCLOSURE

A rolling mill stand includes a base and cap housing which are spaced apart and braced by fixed supports or cheeks at one end of the roll stand and braced and spaced apart by pivotal housing cheeks at the opposite end or non-driving end. The pivotal housing cheeks may be locked in position at which they extend within the ends of the base and the cap piece and provide a strong bracing of the mill stand or they may be pivoted outwardly so as to extend to each side of the mill stand for the purpose of affording access to the stand for the easy removal and replacement of the mill rollers if desired. The arrangement includes means for locking the pivotal housing cheeks in an operative position and insuring that they bear against the cap housing by providing means for wedging the housing toward the pivotal housing cheeks. The stand also includes installation pieces which are adjustably connected to the respective base and cap housing by a threaded bolt carrying member, and each extension piece carries a bearing for rotatably supporting a mill roll.

---

This invention relates in general to the construction of rolling mills, and in particular to a new and useful rolling mill construction having means for facilitating the rapid change of the roller orientation and arrangement and for additionally bracing the frame when additional rollers, such as lateral rollers, are employed.

One of the difficulties in the operation of rolling mills is that when the rolling operation is to be changed in any respect, the mill equipment must always be stopped for long periods of time in order to effect the changeover to a different program. This is particularly so in respect to cold profiling mills, girder and section mills, pipe welding plants and similar installations in which it becomes necessary to exchange large grooved rollers. Particularly in high speed modern installations of this type, the time required for such a change and the resulting cost provide a very unfavorable ratio to the pure product costs. It is customary in cold-profiling and pipe welding plants to make the housing windows of the rolling stands which serve to receive the installation pieces carrying the working shafts or the grooved rolls smaller than the diameter of these rollers. This results in smaller stand dimensions and thus also in lower investment cost.

When it is necessary to change to a different program and to exchange the working shafts of the grooved rolls, this must be effected either by removing the front housing to provide access to the free ends of the shaft, or by removing the roll shafts and disassembling the shafts together with their installation pieces. The latter method is preferred in heavy plants since it is in such plants that it is no longer possible to remove the front housings without great expenditure. The stoppage time has been reduced by preassembling change shafts and constructions permitting the exchange of complete preassembled housings is also known. These methods are very complicated, however, and require additional investment costs. In any case, it is necessary to use a crane or a very heavy lifting device as an auxiliary aid in completing the operation. In some instances, the rolling stands are built with overhung working shafts which permit a rapid exchange of the rollers. But such an arrangement has the disadvantage that the working width is very limited because the sag of the working shafts becomes too great with greater widths and the resulting greater projection of the free shaft ends in order to produce a qualitatively satisfactory product.

In accordance with the invention, the above disadvantages are eliminated by providing a rolling stand which is enclosed and has a two-sided support for the working shaft and groove rolls, respectively. This support is accomplished by the use of housing cheeks which are arranged between a base plate and a housing cap with at least one set being pivotal to permit access and the exchange of the shafts or the rolls in a very short time even though the housing window is smaller than the diameter of the grooved rolls. In a preferred arrangement, the housing cheeks remote from the driving side are mounted pivotally between the base and the housing cap in such a way that they can be swung out laterally about a vertical axis for roll stands having shafts which are mounted for rotation about a horizontal axis. The invention is equally applicable for rolling mills having their shafts either vertically or even obliquely in which event the pivotal cheeks will be mounted for pivotal movement about an axis which is at right angles to the shaft axes.

In order to avoid jamming of the parts during the swinging of the housing cheeks, there is provided, in a further embodiment of the invention, a detachable connection between the housing cap and the housing cheeks. In such a construction the cheeks are advantageously secured on the base plate on the driving side of the rolling stand.

In a further embodiment of the invention, the installation pieces on which the working shafts of the rolls or grooved rolls are supported, are dimensioned so that their height, measured from the roll bearing axis to the plane of engagement of the housing screw, is greater than the radius of the largest roll employed. Such an arrangement facilitates the disassembly of the working shafts with the rolls thereon.

Accordingly, it is an object of this invention to provide a rolling mill having an end construction with pivotal cheeks which may be moved out of the way for assembly and disassembly of the various rolling mill parts.

A further object of the invention is to provide a rolling mill particularly for cold profiling plants, girder and section mills, pipe welding plants, and similar installations of the enclosed type having a two-sided support for the working shafts of the rolls which are usually grooved rolls, and with one of the side supports or support pairs being pivotal inwardly to a position for supporting the working parts and outwardly to a position for access to the working parts for the removal and interchange thereof.

A further object of the invention is to provide a roll stand having supporting cheeks extending between a removable housing cap and a base plate which are pivotally mounted at least on the nondriving side so that they can be swung outwardly about an axis substantially perpendicular to the axes of the rolls.

A further object of the invention is to provide a roll stand in which the installation pieces for supporting the work shafts are dimensioned so that the height measured from the shaft or roll axis to the plane of engagement of the supporting screws for the pieces on the cap housing and the base plate is greater than the radius of the largest roll used.

A further object of the invention is to provide a roll stand which is simple in design, rugged in construction, and economical to manufacture and use.

The various features of novelty which characterize the invention are pointed out with particularity in the claims annexed to and forming a part of this specification. For a better understanding of the invention, its operating advantages and specific objects attained by its use, reference should be had to the accompanying drawings in which there is illustrated and described a preferred embodiment of the invention.

Figure 1:
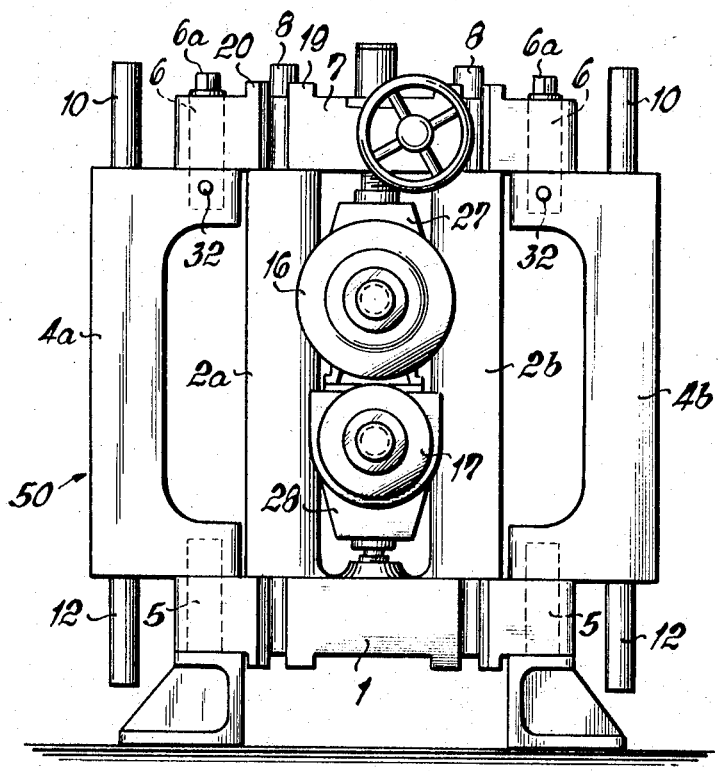
FIG. 1 is an end elevational view of the nondriving side end of a roll stand constructed in accordance with the invention.

Referring to the drawings in particular, the invention provides a roll stand generally designated 50 which is easily adjustable and accessible for changing from one operation to another. The rolling stand is particularly applicable for cold-profiling plants, girder and section mills, and for pipe welding plants and similar installations of the closed type. With such installations, it is not unusual to switch from an operation using two large diameter grooved rollers to an operation in which additional side rollers on each end or side of the grooved rollers may be employed. The drawings will be described in respect to an installation in which the large diameter grooved rollers are mounted on horizontal shafts, but the invention is equally applicable in an installation in which the roller shafts are otherwise mounted, in which event the adjustable mechanism for entrance and access to the parts of the roller stand installation will be correspondingly mounted.

Figure 3:
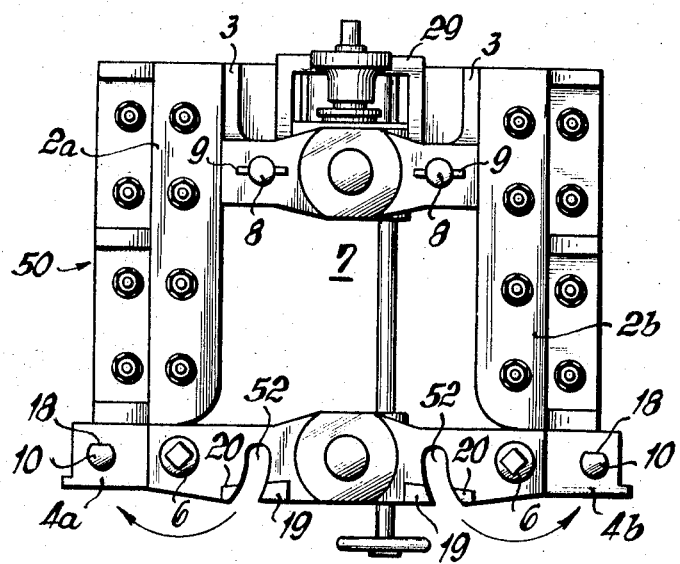
FIG. 3 is a top plan view of the roll stand indicated in FIG. 1 and with the side cheeks swung outwardly.

In the drawings, the roll stand 50 includes a base plate 1 which extends substantially horizontally and provides, at one end, a mounting for first support means including two fixed housing cheeks or supports 2a and 2b for rotatably mounting the roll stand shafts on the driving end of the stand. Additional ribs 3 (FIGS. 3 and 4) are provided for obtaining a better stiffening of the upstanding supports 2a and 2b in respect to the base plate 1.

According to the invention, the second support means on the opposite end of the roll stand includes two housing cheeks 4a and 4b which are pivotal on bolts 5, 5 to respective ends of the base 1 and on bolts 6, 6 to respective ends of a cap housing or cap 7. The cap housing 7 is normally detachably positioned on top of the upper ends of the cheeks 2a and 2b over the pivot bolts 6, 6 of the cheeks 4a and 4b. On the drive side the cap housing 7 is advantageously anchored by wedge members 9 which are driven through slotted bolts 8 which extend upwardly from the cheeks 2a and 2b through openings in the cap housing 7. The wedges 9 are inclined to bear against the wall of the bolt at the upper end of the slot therein and on the cap housing and provide strong bearing connection and bracing between the cap and the cheeks 2a and 2b.

Figure 2:
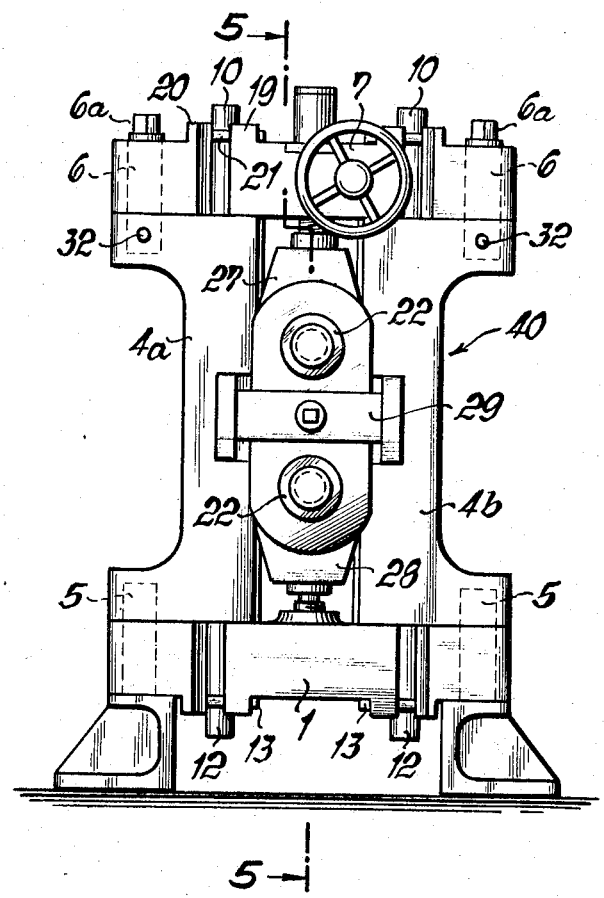
FIG. 2 is a view similar to FIG. 1 with the supporting cheeks indicated in an inward position and with additional means provided for holding the side rollers on the roll stand.
Figure 4:
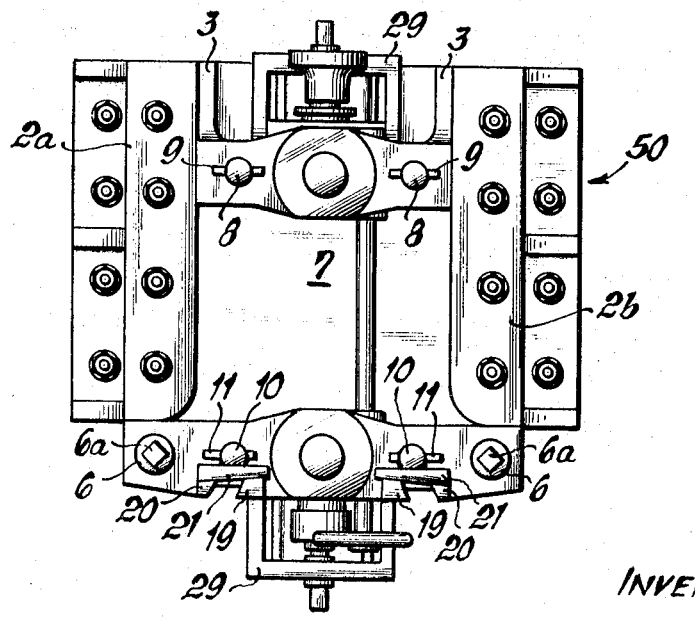
FIG. 4 is a top plan view of the roll stand indicated in FIG. 2 with the side cheeks in an operative inward position.

The bolts 6 are provided with square lug extensions 6a for facilitating rotation thereof. They are connected at their lower ends to the respective cheeks 4a and 4b through a pin 32. Rotation of the bolts 6, 6 would cause a corresponding rotation of the cheeks 4a and 4b. The bracing of the cap housing 7 in respect to the cheeks 4a and 4b after they have swung inwardly to an operative position as indicated in FIG. 2 and FIG. 4, is effected in a manner similar to the bracing of the cap housing with respect to the cheeks 2a and 2b. As indicated in FIG. 4, bolts 10, 10 extend upwardly from respective cheeks 4a and 4b and are accommodated within curved grooves 52 defined in an end of the cap housing 7. A wedge member 11 having an inclined end face is driven through a slot in the bolt 10 to bear against the upper end of the slot in the bolt 10 and the cap housing to cause the firm bracing of the cap housing with the cheeks 4a and 4b after they are positioned in an operative inward position. The housing cheeks 4a and 4b also carry bolts 12 which extend outwardly from their respective lower ends and are secured in respect to the base plate by means of wedges 13 which bear against the upper end of a slot in the bolt 12 and the lower end of the base plate 1.

Figure 5:
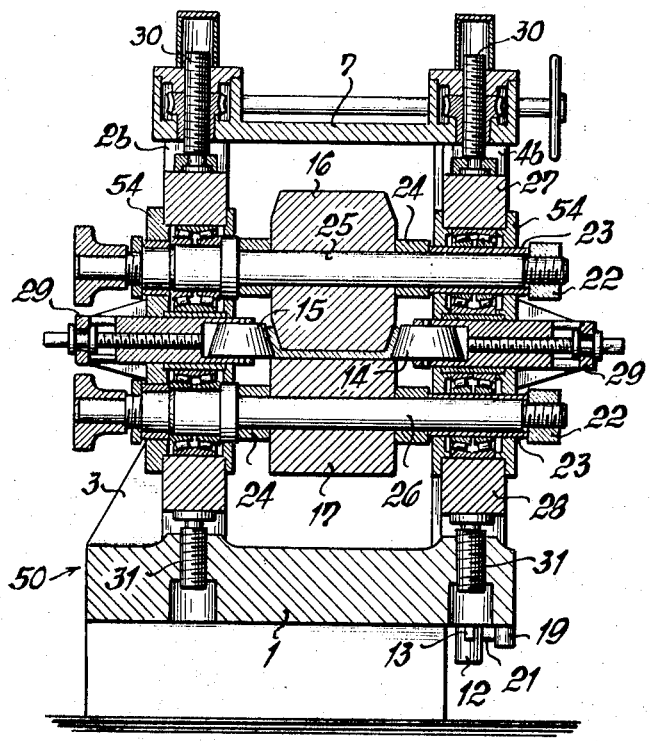
FIG. 5 is a section taken on the line 5—5 of FIG. 2.

The rolling stand includes roll shafts 25 and 26 which are suitably journaled in rollers in a bearing mount or bearings 54. The bearing mount 54 is supported by adjustably positionable installation piece means comprising installation pieces 27 and 28 which respectively extend below the cap housing 7 and above the base 1 and engage and position the bearing mount 54. A threaded member 30 in cap housing 7 and a threaded member 31 in the base are provided for adjusting the positions of the installation pieces and the bearing mount 54. Large sized grooved rollers or rolls 16 and 17 are either keyed or permanently affixed to the respective shafts 25 and 26 and cooperate in the manner indicated. In some instances it is desirable to operate the roll stand with additional side rolls 14 and 15 (FIG. 5) which act in the same deformation plane along with the upper roller 16 and the lower roller 17 as in the represented embodiment of FIGS. 4 and 5. When this arrangement is employed, however, additional axial forces appear which must be absorbed by the housing cheeks. In order that this may be accomplished, the bolts 10 and 12 arranged at the upper and lower ends of the swinging housing cheeks 4a and 4b are each provided with an end or axial thrust bearing surface 18. The housing cap 7 is provided with raised abutments or cam elements having surfaces which form an inclined or wedging surface so that an axial bracing of the end cheeks 4a and 4b can be accomplished by inserting web elements 21, 21 between the surfaces formed by the cam elements 19 and 20 and the associated bolt 10 after the cheeks 4a and 4b are moved from the position indicated in FIG. 3 to the position indicated in FIG. 4. The slots 52, 52 are curved to permit the swinging in or out of the cheeks 4a and 4b.

In order to obtain a firm but detachable connection of the housing 7 with the housing cheeks 2a and 2b on the driving side, additional means can be employed, for example screws or hinges (not shown). The same holds true for vertical and axial bracing of the swinging housing cheeks 4a and 4b with respect to the base plate 1 and the housing cap 7.

The invention also permits easy access to the rollers and roller shafts for the purpose of exchanging them as desired. Exchange of the grooved rolls 16 and 17 can be accomplished, for example, by loosening nuts 22 which firmly brace the grooved rolls 16 and 17 against sleeves 23 and spaces 24 with the shafts 25 and 26. The installation pieces 27 and 28 can be easily removed from the adjusting screws 30 and 31 in a known manner and both pieces 27 and 28 are so dimensioned that their height measured from their roll axis to the plane of engagement of the installation piece with housing screws 30 and 31 on the base 1 and the cap housing 7, respectively, is greater than the radius of the largest grooved roll 16 or 17 which may be used. When side rolls 14 are also to be provided, as indicated in the drawings by way of example, these may be easily disassembled together with the side roll holders 29 after the cheeks 4a and 4b have been swung outwardly to the position indicated in FIG. 3.

Thereafter, the same connection between the housing cheeks 4a and 4b and the base plate 1 as well as the housing cap 7 are loosened by removing the wedges 11, 13 and 21, or if another detachable connection has been used, it is loosened in a known manner. Preferably, wedges 9 which form the connection between the housing cap 7 and the rear housing cheeks 2a and 2b as well as with the base plate 1 are also loosened in order to prevent jamming when the front housing cheeks 4a and 4b are swung out. The housing cheeks 4a and 4b can be swung out by using a box wrench (not shown) which is applied over the square lug 6a of the bolt 6. In the case of very heavy rolling stands, they can also be swung out through the use of a linkage or gearing system or by a similar known mechanical, hydraulic or pneumatic means. The swinging is made in the direction of the arrows indicated in FIG. 3. After the roll stand parts are again reassembled, the cheeks 4a and 4b may be swung backwardly and again braced and locked and then the rolling mill is again ready for use and is strongly braced between the cap housing 7 and the base 1.

In some instances it is desirable that the housing cheeks 4a and 4b be mounted for rotation about, for example, horizontal axes upwardly and downwardly, as mentioned previously. The corresponding design of the rolling stand will permit this within the scheme of the invention.

Thus, the invention provides a rolling stand which ensures not only short changeover time in a simple and economical manner, but also provides a roll stand which is of simple manufacture, rugged design and long life.

While a specific embodiment of the invention has been shown and described in detail to illustrate the application of the invention principles, it will be understood that the invention may be embodied otherwise without departing from such principles.

What is claimed is:

1. A rolling stand comprising a base, a cap housing, first support means extending between said cap housing and said base at one end of the rolling stand, second support means extending between said cap housing and said base at the opposite end of the rolling stand, said second support means comprising at least one housing cheek pivotally connected adjacent its top and bottom to said cap housing and said base, respectively, and extending from the pivotal connections in a direction inwardly toward the center of the roll stand and bearing between said cap housing and said base for bracing the rolling stand, said housing cheek being movable outwardly about the pivotal connections to extend to a side of said cap housing and base for affording access to said roll stand between said cap housing and base, and means for rotatably mounting rolls between said cap housing and said base.

2. A rolling stand comprising a base, a cap housing, first support means extending between said cap housing and said base at one end of the rolling stand, second support means extending between said cap housing and said base at the opposite end of the rolling stand, said second support means comprising at least one housing cheek pivotally connected adjacent its top to said cap housing and adjacent its bottom to said base and extending from its pivotal connection in a direction inwardly toward the center of the roll stand and bearing between said cap housing and said base for bracing the rolling stand, said housing cheek being pivotal outwardly to extend to a side of said cap housing and base for affording access to the central portion of said roll stand, first and second roll shafts having first and second rolls thereon arranged in cooperative alignment for receiving a workpiece therebetween, bearing means for rotatably supporting said first and second roll shafts, and installation piece means connected between said cap housing and said base and positioning and holding said bearing means between said cap housing and said base.

3. A rolling stand comprising a base, a cap housing, first support means extending between said cap housing and said base at one end of the rolling stand, second support means extending between said cap housing and said base at the opposite end of the rolling stand, said second support means comprising at least one housing cheek pivotally connected adjacent its top to said cap housing and adjacent its bottom to said base and extending from its pivotal connection in a direction inwardly toward the center of the roll stand and bearing between said cap housing and said base for bracing the rolling stand, said housing cheek being pivotal outwardly to extend to a side of said cap housing and base for affording access to the central portion of said roll stand, first and second roll shafts having first and second rolls thereon arranged in cooperative alignment for receiving a workpiece therebetween, bearing means for rotatably supporting said first and second roll shafts, and first and second installation pieces engaging said bearing means for positioning and holding said bearing means between said cap housing and said base, means adjustably connecting said first installation piece to said cap housing and said second installation piece to said base, said first and second installation pieces having respective dimensions as measured from said base and said cap housing to the plane of engagement of said bearing means with respective first and second rolls which is greater than the radius of said first and second rolls.

4. A rolling stand particularly for cold-profiling plants, girder and section mills, pipe welding plants and similar installations of the enclosed type comprising a cap housing, a base, first and second supporting cheeks extending between said cap housing and said base at one end of the rolling stand first and second pivotal housing cheeks extending between said cap housing and said base at the opposite end of the rolling stand, said first and second pivotal housing cheeks having bolts extending upwardly from the top thereof adjacent their outer ends and being rotatable in said cap housing for pivotally supporting said cheeks from said cap housing, means for securing said first and second pivotal housing cheeks in a closed operative position extending along the edge of said base, first and second roll shafts having first and second rolls thereon in cooperative alignment for receiving a workpiece therebetween, and bearing means for rotatably supporting said first and second roll shafts between said cap housing and said base.

5. A rolling stand particularly for cold-profiling plants, girder and section mills, and pipe welding plants and similar installations of the enclosed type comprising a cap housing, a base, first and second supporting cheeks extending between said cap housing and said base at one end of the rolling stand, first and second pivotal housing cheeks extending between said cap housing and said base at the opposite end of the rolling stand, said first and second pivotal housing cheeks having bolts extending upwardly from the top thereof and being rotatable in said cap housing for pivotally supporting them from said cap housing, said first and second pivotal housing cheeks having lower bolt members extending downwardly therefrom into said base and being rotatable in said base, a securing bolt member extending outwardly from the top of said first and second pivotal housing cheeks adjacent their outer ends, said cap housing having a curved slot defined therein for receiving said securing bolt member when said first and second pivotal housing cheeks are moved to extend substantially parallel to the edge of said cap housing, means engageable with said securing bolt member for securing said cheeks in an operative position extending inwardly toward the center of said roll sand from the pivotal connection to said cap housing including means to hold said bolt member in said slot and wedge means for wedging said cap housing against said cheek member, and means rotatably mounting rolls between said cap housing and said base.

6. A rolling stand particularly for cold-profiling plants, girder and section mills, and pipe welding plants and similar installations of the enclosed type comprising a cap housing, a base, first and second supporting cheeks extending between said cap housing and said base at one end of the rolling stand, first and second pivotal housing cheeks extending between said cap housing and said base at the opposite end of the rolling stand, said first and second pivotal housing cheeks having bolts extending upwardly from the top thereof and being rotatable in said cap housing for pivotally supporting said pivotal cheeks from said cap housing, said first and second pivotal housing cheeks having lower bolt members extending downwardly therefrom into said base and being rotatable in said base, a securing bolt member extending outwardly from the top of said third and fourth cheek members adjacent their outer ends, said cap housing having a curved slot defined therein for receiving said securing member when said third and fourth cheek members are moved to extend substantially parallel to the edge of said cap housing toward the center of said roll stand, means engageable with said securing bolt member for securing said cheeks in an operative position extending inwardly toward the center of said roll stand from the pivotal connection to said cap housing including means to hold said bolt member in said slots, wedge means for wedging said cap housing against said cheek member, said bolt member having a slot defined therein, said wedge means including a wedge member wedged against the upper end of said slot and bearing against said cap housing, means rotatably mounting rolls between said cap housing and said base including first and second roll shafts having first and second rolls thereon in cooperative alignment for receiving a workpiece therebetween, bearing means for rotatably supporting said first and second roll shafts, and installation piece means connected between said cap housing and said base for positioning and locating said bearing means between said cap housing and said base.

7. A rolling stand particularly for cold-profiling plants, girder and section mills, and pipe welding plants and similar installations of the enclosed type comprising a cap housing, a base, first and second supporting cheeks extending between said cap housing and said base at one end of the rolling stand, first and second pivotal housing cheeks extending between said cap housing and said base at the opposite end of the rolling stand, said first and second pivotal housing cheeks having bolts extending upwardly from the top thereof and being rotatable in said cap housing for pivotally supporting them from said cap housing, said first and second pivotal housing cheeks having lower bolt members extending downwardly therefrom into said base and being rotatable in said base, means for securing said cheeks in an operative position extending inwardly toward the center of said roll stand from the pivotal connection to said cap housing, means rotatably mounting rolls between said cap housing and said base including first and second roll shafts having first and second rolls thereon in cooperative alignment for receiving a workpiece therebetween, means for mounting at least one side roller for rotation about an axis at a angle to said first and second roll shafts for cooperation with a side of at least one of said first and second rolls, bearing means for rotatably supporting said first and second roll shafts, installation piece means connected between said cap housing and said base for positioning and locating said bearing means between said cap housing and said base, and a side roller rotatably mounted on said means for mounting said side roller.

8. A rolling stand particularly for cold-profiling plants, girder and section mills, and pipe welding plants and similar installations of the enclosed type comprising a cap housing, a base, first and second supporting cheeks extending between said cap housing and said base at one end of the rolling stand, first and second pivotal housing cheeks extending between said cap housing and said base at the opposite end of the rolling stand, said first and second supporting cheeks having slotted bolts extending upwardly from the tops thereof, said cap housing having openings defined in alignment with respective ones of said bolts, said bolts extending through said openings, and wedge means in the slots of said bolts wedging said cap housing down onto said first and second supporting cheeks, said first and second pivotal housing cheeks having bolts extending upwardly from the top thereof and being rotatable in said cap housing for pivotally supporting said pivotal cheeks from said cap housing, said first and second pivotal housing cheeks having lower bolt members extending downwardly therefrom into said base and being rotatable in said base, a securing bolt member extending outwardly from the top and bottom of said first and second pivotal housing cheeks adjacent their outer ends, said cap housing having a curved slot defined therein for receiving said securing member when said pivotal cheeks are moved toward the center of said roll stand, means for securing said cheeks in an operative position extending inwardly toward the center of said roll stand from the pivotal connection to said cap housing including means to hold said securing bolt member in said slot and wedge means for wedging said cap housing against said cheek member, said securing bolt member having a slot defined therein, said wedge means including a wedge member wedged against the upper end of said slot and bearing against said cap housing, first and second roll shafts having first and second rolls thereon in cooperative alignment for receiving a workpiece therebetween, bearing means for rotatably supporting said first and second roll shafts, and installation piece means connected between said cap housing and said base for positioning and locating said bearing means between said cap housing and said base.

9. A rolling stand particularly for cold-profiling plants, girder and section mills, and pipe welding plants and similar installations of the enclosed type comprising a cap housing, a base, first and second supporting cheeks extending between said cap housing and said base at one end of the rolling stand, first and second pivotal housing cheeks extending between said cap housing and said base at the opposite end of the rolling stand, said first and second supporting cheeks having slotted bolts extending upwardly from the tops thereof, said cap housing having openings defined in alignment with respective ones of said bolts, said bolts extending through said openings, and wedge means in the slots of said bolts wedging said cap housing down onto said first and second cheeks, said first and second pivotal housing cheeks having bolts extending upwardly from the top thereof and being rotatable in said cap housing for pivotally supporting said cheeks from said cap housing, said first and second pivotal housing cheeks having lower bolt members extending downwardly therefrom into said base and being rotatable in said base, a securing bolt member extending outwardly from the top and bottom of said first and second pivotal cheeks adjacent their outer ends, said cap housing having a curved slot defined therein for receiving said securing bolt member when said pivotal cheeks members are moved toward the center of said roll stand, means for securing said cheeks in an operative position extending inwardly toward the center of said roll stand from the pivotal connectifon to said cap housing including means to hold said securing bolt member in said slot and wedge means for wedging said cap housing against said cheek member, said securing bolt member having a slot defined therein, said wedge means including a wedge member wedged against the upper end of said slot and bearing against said cap housing, first and second roll shafts having first and second rolls thereon in cooperative alignment for receiving a workpiece therebetween, means for mounting at least one side roller for rotation about an axis at an angle to said first and second roll shafts for cooperation with a side of at least one of said first and second rolls, bearing means for rotatably supporting said first and second roll shafts, installation piece means connected between said cap housing and said base for positioning and locating said bearing means between said cap housing and said base, and a side roller rotatably mounted on said means for mounting said side roller.

References Cited

UNITED STATES PATENTS

| | | | |
|---|---|---|---|
| 355,390 | 1/1887 | Daniels | 72—238 |
| 2,064,453 | 12/1936 | Wheeler | 72—238 |
| 2,811,194 | 10/1957 | Frehn et al. | 72—99 |

CHARLES W. LANHAM, *Primary Examiner.*

A. RUDERMAN, *Assistant Examiner.*